US010342089B1

(12) United States Patent
Lin

(10) Patent No.: US 10,342,089 B1
(45) Date of Patent: Jul. 2, 2019

(54) CONSTANT CURRENT DEVICE AND HEAT DISPERSION MODULE THEREOF

(71) Applicant: Chicony Power Technology Co., Ltd., New Taipei (TW)

(72) Inventor: Chen-Chi Lin, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/169,575

(22) Filed: Oct. 24, 2018

(30) Foreign Application Priority Data

Sep. 3, 2018 (TW) .............................. 107130885 A

(51) Int. Cl.
*H05B 33/08* (2006.01)
*F21V 29/508* (2015.01)

(52) U.S. Cl.
CPC ....... *H05B 33/0851* (2013.01); *F21V 29/508* (2015.01); *H05B 33/089* (2013.01)

(58) Field of Classification Search
None
See application file for complete search history.

(56) References Cited

U.S. PATENT DOCUMENTS

| 8,492,988 | B2 | 7/2013 | Nuhfer et al. | |
|---|---|---|---|---|
| 2006/0001381 | A1* | 1/2006 | Robinson | H05B 33/0815 |
| | | | | 315/185 R |
| 2009/0128055 | A1* | 5/2009 | Shin | H05B 33/0818 |
| | | | | 315/301 |
| 2010/0283773 | A1* | 11/2010 | Kim | G09G 3/20 |
| | | | | 345/211 |
| 2011/0012522 | A1* | 1/2011 | Cheng | H05B 33/0815 |
| | | | | 315/224 |
| 2012/0032612 | A1* | 2/2012 | Antony | H05B 33/089 |
| | | | | 315/297 |

FOREIGN PATENT DOCUMENTS

| CN | 201657419 | U | 11/2010 |
|---|---|---|---|
| CN | 102668702 | B | 1/2016 |
| CN | 104105264 | B | 1/2017 |
| CN | 108271287 | A | 7/2018 |
| TW | M320818 | U | 10/2007 |
| TW | M423416 | U | 2/2012 |
| TW | I462638 | B | 11/2014 |
| TW | I511614 | B | 12/2015 |
| TW | I621317 | B | 4/2018 |

* cited by examiner

*Primary Examiner* — Jany Richardson
(74) *Attorney, Agent, or Firm* — Muncy, Geissler, Olds & Lowe, P.C.

(57) ABSTRACT

A constant current device and a heat dispersion module thereof used for stabilizing a current of a light emitting unit are disclosed. The heat dispersion module includes an impedance element, a detection control unit, a switch unit, and a feedback unit. The detection control unit is used to detect a node voltage value between the light emitting unit and a current regulating unit. The switch unit switches between an on-state and an open state; when the switch unit is in the on-state, a current of the current regulating unit is conducted to a ground via the switch unit; when the switch unit is in the open state, the current of the current regulating unit is conducted to the ground via the impedance element. The feedback unit causes the switching unit to exhibit hysteresis when changing between the on-state and the open state.

17 Claims, 6 Drawing Sheets

CONSTANT CURRENT DEVICE AND HEAT DISPERSION MODULE THEREOF

BACKGROUND OF THE INVENTION

1. Field of the Invention

The present invention relates to a constant current device and a heat dispersion module thereof, particularly to a constant current device that can use impedances to distribute power dissipation and a heat dispersion module thereof.

2. Description of the Related Art

With the development of technology, linear constant current regulators (CCRs) connected in series to LEDs have been widely used in current lighting devices to achieve a fixed brightness output as shown in FIG. 1. FIG. 1 is an architecture diagram of a constant current device in the prior art. A constant current device 90 in the prior art includes a power input 91, a light emitting unit 92, a current regulating unit 93 and a ground G. After the power input 91 inputs a power signal, the light emitting unit 92 is illuminated. The current regulating unit 93 controls the current flowing through the light emitting unit 92 within a certain range. However, when the current regulating unit 93 has a wide range of input voltages, the power dissipation of the circuit components is also varied over a wide range. To make the light emitting unit 92 safe to use, it is generally designed with the consideration of maximum power dissipation of component. However, with this method, the small volume of the current regulating unit 93 has to endure large power dissipation, namely the heat is hard to dissipate.

Accordingly, it is necessary to devise a new constant current device and a heat dispersion module to solve the problem in the prior art.

SUMMARY OF THE INVENTION

It is a major objective of the present invention to provide a constant current device that can use impedances to distribute power dissipation.

It is another major objective of the present invention to provide a heat dispersion module used for the constant current device described above.

To achieve the above objectives, the constant current device of the present invention is used for stabilizing a current of a light emitting unit. The light emitting unit is electrically connected to a power supply. The constant current device includes a current regulating unit and a first heat dispersion module. The current regulating unit is electrically connected to the light emitting unit. The first heat dispersion module includes a first impedance element, a first detection control unit, a first switch unit and a first feedback unit. The first impedance element is electrically connected between the current regulating unit and a ground. The first detection control unit is electrically connected to the light emitting unit for detecting a node voltage value between the light emitting unit and the current regulating unit. The first switch unit is electrically connected to the first detection control unit, the current regulating unit and the ground. The first switch unit is controlled by the first detection control unit to switch between an on-state and an open state according to the node voltage value; when the first switch unit is in the on-state, a current of the current regulating unit is conducted to the ground via the first switch unit; when the first switch unit is in the open state, the current of the current regulating unit is conducted to the ground via the first impedance element. The first feedback unit is electrically connected between the first switch unit and the first detection control unit. The first feedback unit causes the first switching unit to exhibit hysteresis when changing between the on-state and the open state.

The heat dispersion module of the present invention is used in the constant current device and is electrically connected to the current regulating unit. The current regulating unit is used for stabilizing the current of the light emitting unit. The light emitting unit is electrically connected to the power supply. The heat dispersion module includes an impedance element, a detection control unit, a switch unit and a feedback unit. The impedance element is electrically connected between the current regulating unit and the ground. The detection control unit is electrically connected to the light emitting unit for detecting a node voltage value between the light emitting unit and the current regulating unit. The switch unit is electrically connected to the detection control unit, the current regulating unit and the ground. The switch unit is controlled by the detection control unit to switch between an on-state and an open state according to the node voltage value; when the switch unit is in the on-state, the current of the current regulating unit is conducted to the ground via the switch unit; when the switch unit is in the open state, the current of the current regulating unit is conducted to the ground via the impedance element. The feedback unit is electrically connected between the switch unit and the detection control unit. The feedback unit causes the switching unit to exhibit hysteresis when changing between the on-state and the open state.

DETAILED DESCRIPTION OF THE PREFERRED EMBODIMENT

Hereafter, the technical content of the present invention will be better understood with reference to preferred embodiments.

Figure 1:
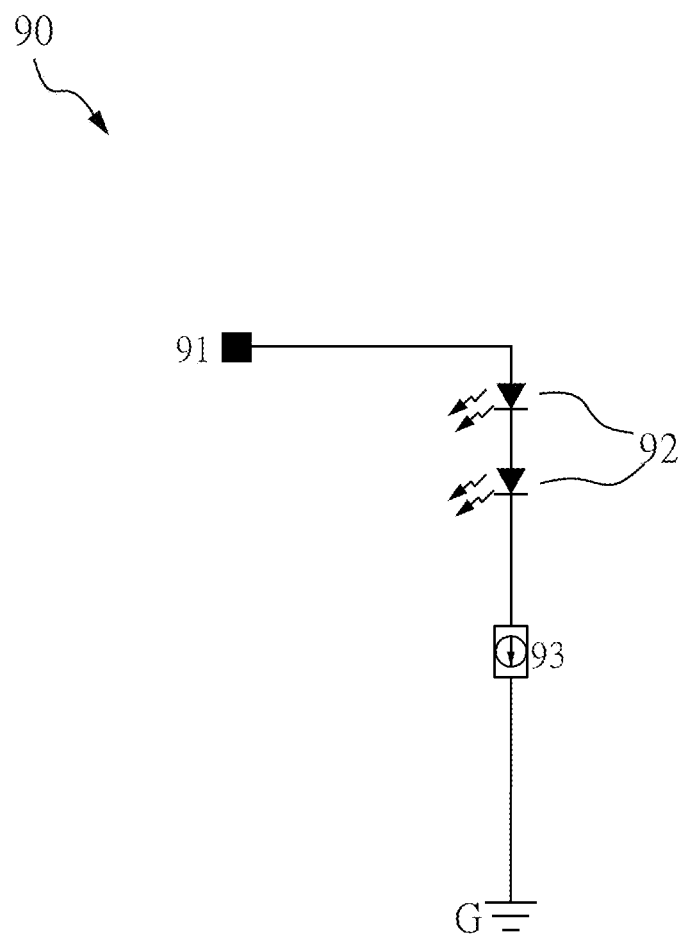
FIG. 1 is an architecture diagram of a constant current device in the prior art.
Figure 2:
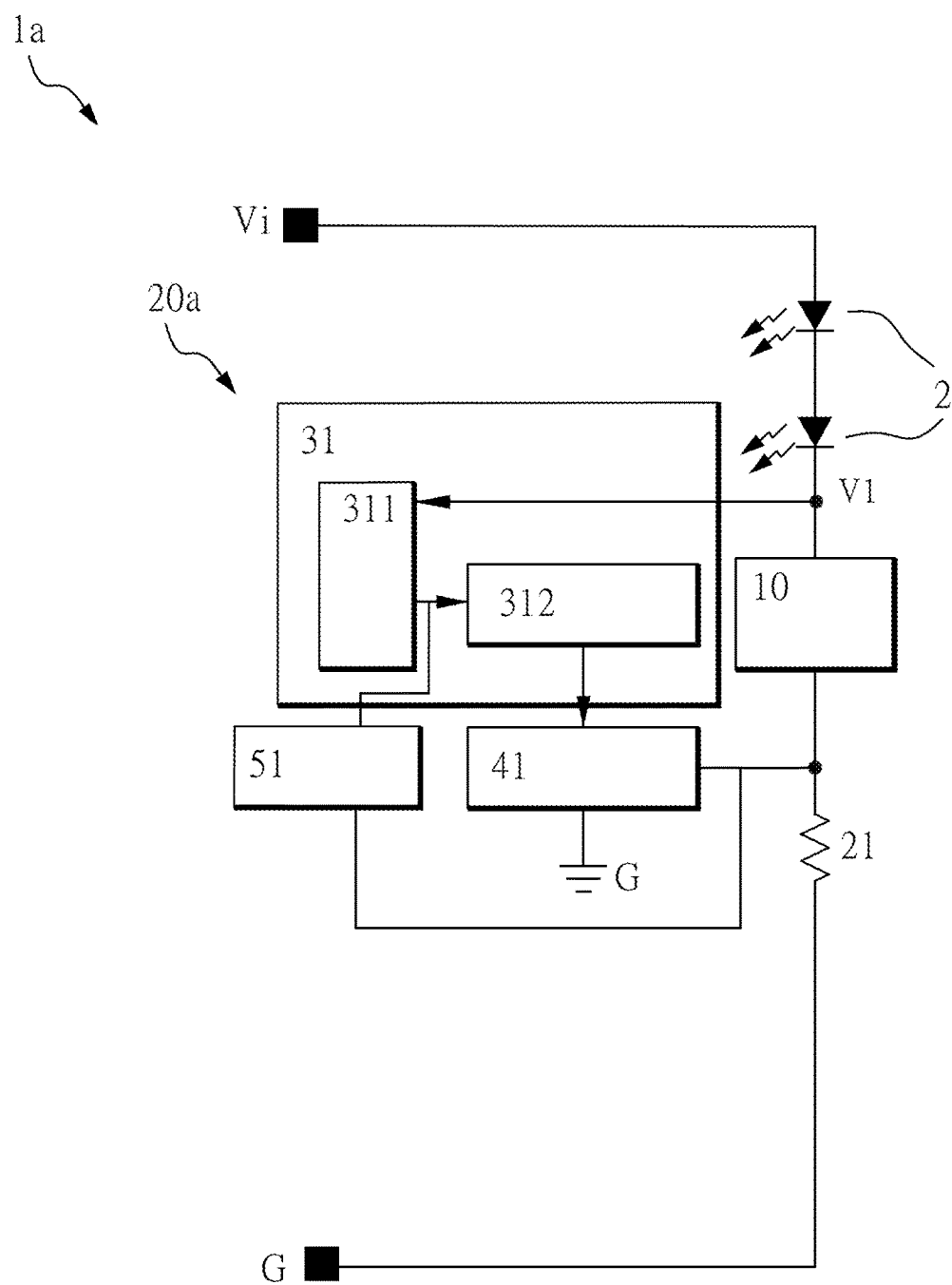
FIG. 2 is an architecture diagram of a constant current device in a first embodiment of the present invention.

Hereafter, please first refer to FIG. 2, which is an architecture diagram of a constant current device in a first embodiment of the present invention. It should be noted that although the following description uses the terms "first", "second", etc. to describe various elements, these elements should not be limited by the terms. These terms are only used to distinguish one element from another. For example, a first heat dispersion module may be referred to as a second heat dispersion module; similarly, a second heat dispersion module may be referred to as a first heat dispersion module without departing from the scope of various described embodiments. Each of the first heat dispersion module and the second heat dispersion module is a heat dispersion module, but they are not the same heat dispersion module.

In the first embodiment of the present invention, a constant current device 1a with adaptive distribution of power dissipation is used for stabilizing a current of a light emitting unit 2. The light emitting unit 2 is electrically connected to a power supply Vi. The constant current device 1a includes a current regulating unit 10 and a first heat dispersion module 20a. The current regulating unit 10 is a linear constant current regulator (CCR) module electrically connected to the light emitting unit 2 for stabilizing the current of the light emitting unit 2 such that the light emitting unit 2 achieves a fixed brightness output. The first heat dispersion module 20a includes a first impedance element 21, a first detection control unit 31, a first switch unit 41 and a first feedback unit 51. The above-mentioned element and units are electrically connected to one another. The first impedance element 21 is electrically connected between the current regulating unit 10 and a ground G. The first detection control unit 31 is electrically connected to the light emitting unit 2 for detecting a node voltage value V1 between the light emitting unit 2 and the current regulating unit 10. The first detection control unit 31 includes a first detection circuit 311 and a first control circuit 312. The first detection circuit 311 is electrically connected to the light emitting unit 2. The first control circuit 312 is electrically connected to the first detection circuit 311. The first detection circuit 311 detects the node voltage value V1 and generates a first comparison voltage according to the node voltage value V1, and the first control circuit 312 outputs one of a first on signal and a first open signal according to the first comparison voltage.

The first switch unit 41 is electrically connected to the first detection control unit 31, the current regulating unit 10 and the ground G. The first switch unit 41 is controlled by the first detection control unit 31 to switch between an on-state and an open state according to the node voltage value V1. If the node voltage value V1 is not greater than a first threshold, the first switch unit 41 is in the on-state; if the node voltage value V1 is greater than the first threshold, the first switch unit 41 is in the open state. When the first switch unit 41 is in the on-state, a current of the current regulating unit 10 is conducted to the ground G via the first switch unit 41. When the first switch unit 41 is in the open state, the current of the current regulating unit 10 is conducted to the ground G via the first impedance element 21. The first feedback unit 51 is electrically connected between the first switch unit 41 and the first detection control unit 31. The first feedback unit 51 causes the first switch unit 41 to exhibit hysteresis when changing between the on-state and the open state. Thus the first feedback unit 51 can prevent the first switch unit 41 from switching wrongly and frequently.

Figure 3:
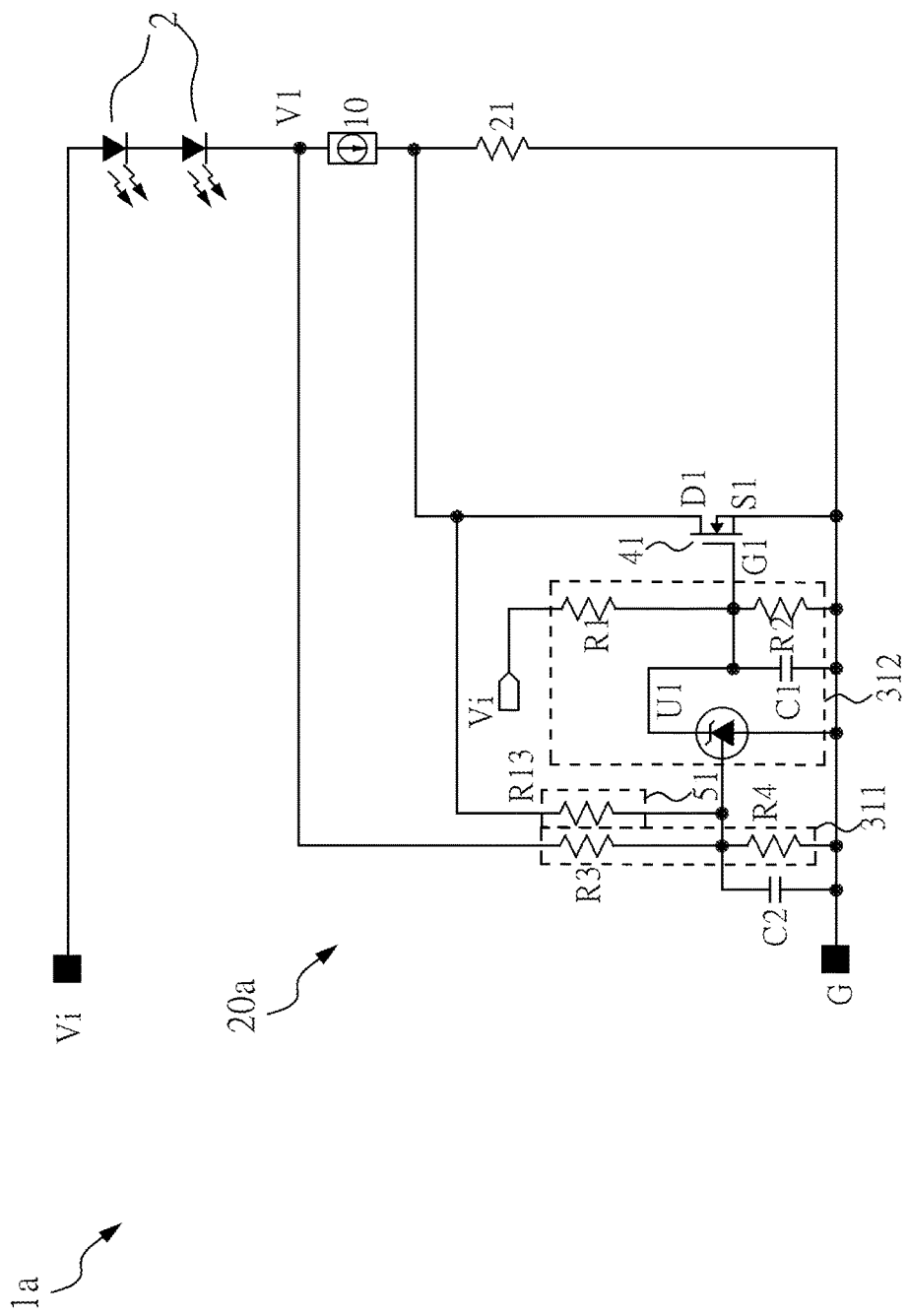
FIG. 3 is a schematic diagram showing a circuit of the constant current device according to the first embodiment of the present invention.

Please refer to FIG. 3 for a schematic diagram, which shows a circuit of the constant current device according to a first embodiment of the present invention.

In the first embodiment of the present invention, the first detection circuit 311 of the first heat dispersion module 20a is a voltage divider circuit including resistors R3, R4. In the present embodiment, the first control circuit 312 is a comparator including a three-terminal shunt regulator U1 and resistors R1, R2. The first switch unit 41 is a transistor switch including a first control terminal G1, a first connection terminal D1 and a second connection terminal S1. The first control terminal G1 is a gate terminal electrically connected to the first control circuit 312 and receives any of the first on signal and the first open signal. The first connection terminal D1 is a drain terminal electrically connected to the current regulating unit 10, the first impedance element 21 and the first feedback unit S1, wherein the first feedback unit 51 is a resistor R13. The second connection terminal S1 is a source terminal electrically connected to the ground G. In the first embodiment of the present invention, the first threshold is Vref1*(R3+(R4//R13))/(R4//R13), where Vref1 is an internal reference voltage of the three-terminal shunt regulator U1. When the node voltage value V1 is not greater than the first threshold, the first control terminal G1 receives a first on signal, and the first connection terminal D1 and the second connection terminal S1 are conducted to each other to form the on-state. At this time, the voltage divided by the resistors R3, R4 and the first feedback unit 51 (i.e., the first comparison voltage) is less than the internal reference voltage Vref1 of the three-terminal shunt regulator U1, causing the three-terminal shunt regulator U1 to be open-circuited. As a result, the first connection terminal D1 and the second connection terminal S1 of the first switch unit 41 are short-circuited due to voltage division of the resistors R1 and R2. At this time, the first impedance element 21 is bypassed by the first switch unit 41.

When the node voltage value V1 is greater than the first threshold, the first control terminal G1 receives the first open signal, and the first connection terminal D1 and the second connection terminal S1 are non-conducted to each other to form the open state. At this time, the voltage divided by the resistors R3, R4 and the first feedback unit 51 is greater than the internal reference voltage Vref1 of the three-terminal shunt regulator U1, and the three-terminal shunt regulator U1 is short-circuited, causing the first connection terminal D1 and the second connection terminal S1 of the first switch unit 41 to be open-circuited due to insufficient cross-voltage between the first control terminal G1 and the second connection terminal S1. In other words, when the node voltage value V1 is less than the first threshold, the first switch unit 41 is short-circuited, and the current supplied from the power supply Vi flows through the light emitting unit 2, the current regulating unit 10, and the first switch unit 41 to the ground G. When the node voltage value V1 is greater than the first threshold, the first switch unit 41 is open-circuited, and the current supplied from the power supply Vi flows through the light emitting unit 2, the current regulating unit 10, and first impedance element 21 to the ground G. Accordingly, the first heat dispersion module 20a can adaptively use the first impedance element 21 according to the node voltage value V1 to distribute and share the power dissipation of the current regulating unit 10 to improve the heat dissipation of the current regulating unit 10.

Figure 4:
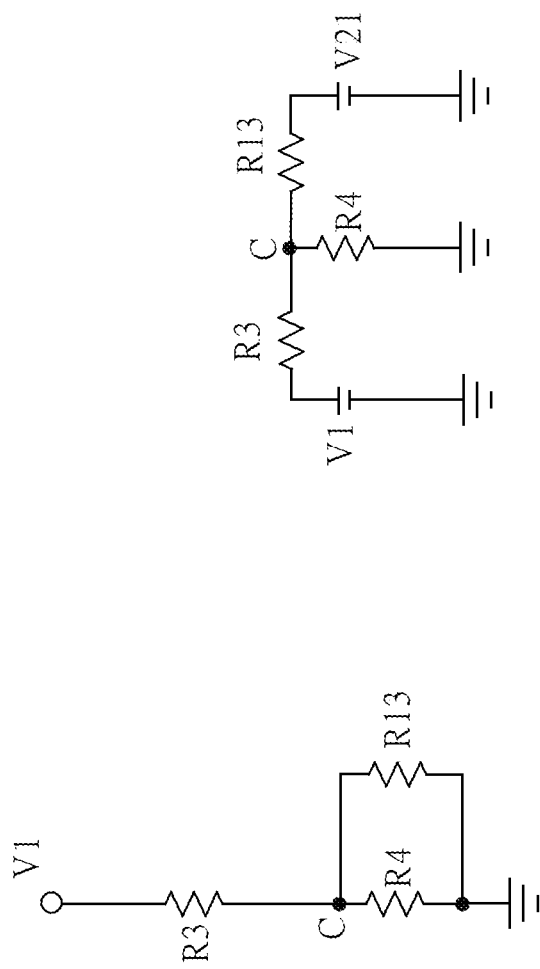
FIG. 4A is a schematic diagram showing an equivalent circuit of a first detection circuit and a first feedback unit of the present invention when a first switch unit is in an on-state.
FIG. 4B is a schematic diagram showing an equivalent circuit of the first detection circuit and the first feedback unit of the present invention when the first switch unit is in an open state.

Please refer to FIG. 4A for a schematic diagram showing an equivalent circuit of the first detection circuit 311 and the first feedback unit 51 of the present invention when the first switch unit 41 is in the on-state. In the on-state, the resistor R13 of the first feedback unit 51 is connected in parallel with the resistor R4 of the first detection circuit 311 and is connected in series with the resistor R3.

Please refer to FIG. 4B for a schematic diagram showing an equivalent circuit of the first detection circuit 311 and the first feedback unit 51 of the present invention when the first switch unit 41 is in the open state. In the open state, the resistor R13 of the first feedback unit 51 and the resistors R3, R4 of the first detection circuit 311 are connected to a common point C, where V21 represents a cross-voltage of the first impedance element 21.

As compared with that in FIG. 4A, the voltage value of the common point C in FIG. 4B is relatively high. If the first switch unit 41 during the state of FIG. 4B is to be turned on and back to the state of FIG. 4A, the node voltage value V1 must be lowered to a voltage level lower than the first threshold, that is, $\{Vref1-[V21*(R3//R4)/((R3//R4)+R13)]\}*(R3+(R4//R13))/(R4//R13)$, such that the voltage value of the common point C (i.e., the first comparison voltage) can be lower than the internal reference voltage Vref1 of the three-terminal shunt regulator U1, then again to make the first switch unit 41 short-circuited. Therefore, the first feedback unit 51 can cause the first switch unit 41 to exhibit hysteresis when changing between the on-state and the open state. Thus the first feedback unit 51 can prevent the first switch unit 41 from switching wrongly and frequently.

Figure 5:
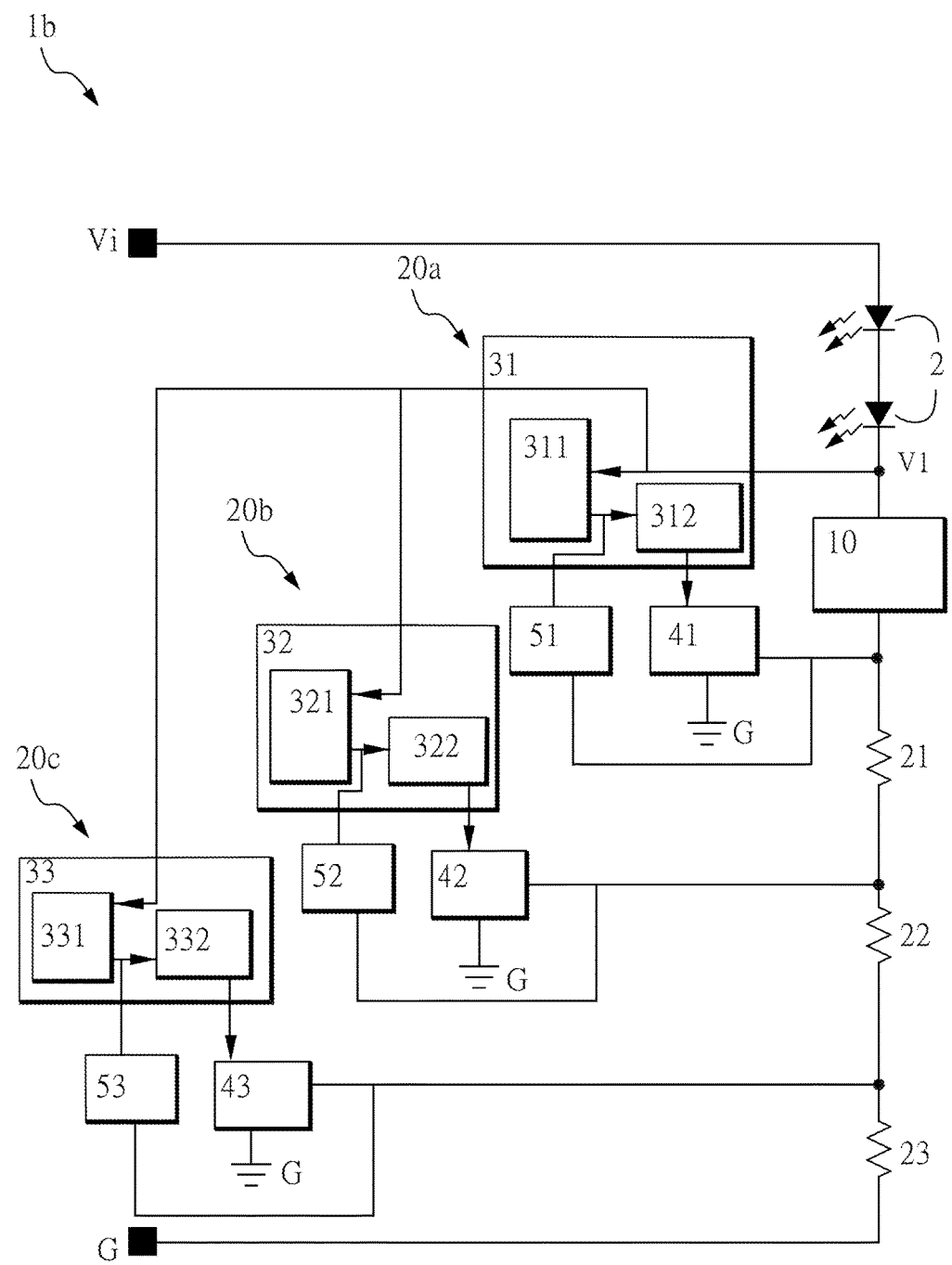
FIG. 5 is an architecture diagram of a constant current device in a second embodiment of the present invention.

Please refer to FIG. 5 for an architecture diagram of a constant current device in a second embodiment of the present invention.

The present invention is not limited to one set of the first heat dispersion module 20a. In the second embodiment of the present invention, the constant current device 1b can further include a second heat dispersion module 20b and a third heat dispersion module 20c. The second heat dispersion module 20b includes a second impedance element 22, a second detection control unit 32, a second switch unit 42 and a second feedback unit 52. The third heat dispersion module 20c includes a third impedance element 23, a third detection control unit 33, a third switch unit 43 and a third feedback unit 53. The second impedance element 22 is electrically connected between the first impedance element 21 and the ground G. The second detection control unit 32 is electrically connected to the light emitting unit 2 for detecting the node voltage value V1. The second detection control unit 32 includes a second detection circuit 321 and a second control circuit 322. The second detection circuit 321 is electrically connected to the light emitting unit 2. The second control circuit 322 is electrically connected to the second detection circuit 321. The second detection circuit 321 detects the node voltage value V1 and generates a second comparison voltage according to the node voltage value V1. The second control circuit 322 outputs one of a second on signal and a second open signal according to the second comparison voltage.

The second switch unit 42 is electrically connected to the second detection control unit 32, the first impedance element 21 and the ground G. The second switch unit 42 is controlled by the second detection control unit 32 to switch between an on-state and an open state according to the node voltage value V1. If the node voltage value V1 is not greater than a second threshold, the second switch unit 42 is in the on-state; if the node voltage value V1 is greater than the second threshold, the second switch unit 42 is in the open state, where the second threshold is greater than the first threshold. When the second switch unit 42 is in the on-state, a current of the first impedance element 21 is conducted to the ground G via the second switch unit 42; when the second switch unit 42 is in the open state, the current of the first impedance element 21 is conducted to the ground G via the second impedance element 22. The second feedback unit 52 is electrically connected between the second switch unit 42 and the second detection control unit 32. The second feedback unit 52 causes the second switch unit 42 to exhibit hysteresis when changing between the on-state and the open state. Thus the second feedback unit 52 can prevent the second switch unit 42 from switching wrongly and frequently.

Similarly, the third impedance element 23 is electrically connected between the second impedance element 22 and the ground G. The third detection control unit 33 is electrically connected to the light emitting unit 2 for detecting the node voltage value V1. The third detection control unit 33 includes a third detection circuit 331 and a third control circuit 332. The third detection circuit 331 is electrically connected to the light emitting unit 2. The third control circuit 332 is electrically connected to the third detection circuit 331. The third detection circuit 331 detects the node voltage value V1 and generates a third comparison voltage according to the node voltage value V1. The third control circuit 332 outputs one of a third on signal and a third open signal according to the third comparison voltage.

The third switch unit 43 is electrically connected to the third detection control unit 33, the second impedance element 22 and the ground G. The third switch unit 43 is controlled by the third detection control unit 33 to switch between an on-state and an open state according to the node voltage value V1. If the node voltage value V1 is not greater than a third threshold, the third switch unit 43 is in the on-state; if the node voltage value V1 is greater than the third threshold, the third switch unit 43 is in the open state, where the third threshold is greater than the second threshold. When the third switch unit 43 is in the on-state, a current of the second impedance element 22 is conducted to the ground G via the third switch unit 43; when the third switch unit 43 is in the open state, the current of the second impedance element 22 is conducted to the ground G via the third impedance element 23. The third feedback unit 53 is electrically connected between the third switch unit 43 and the third detection control unit 33. The third feedback unit 53 causes the third switch unit 43 to exhibit hysteresis when changing between the on-state and the open state. Thus the third feedback unit 53 can also prevent the third switch unit 43 from switching wrongly and frequently.

Figure 6:
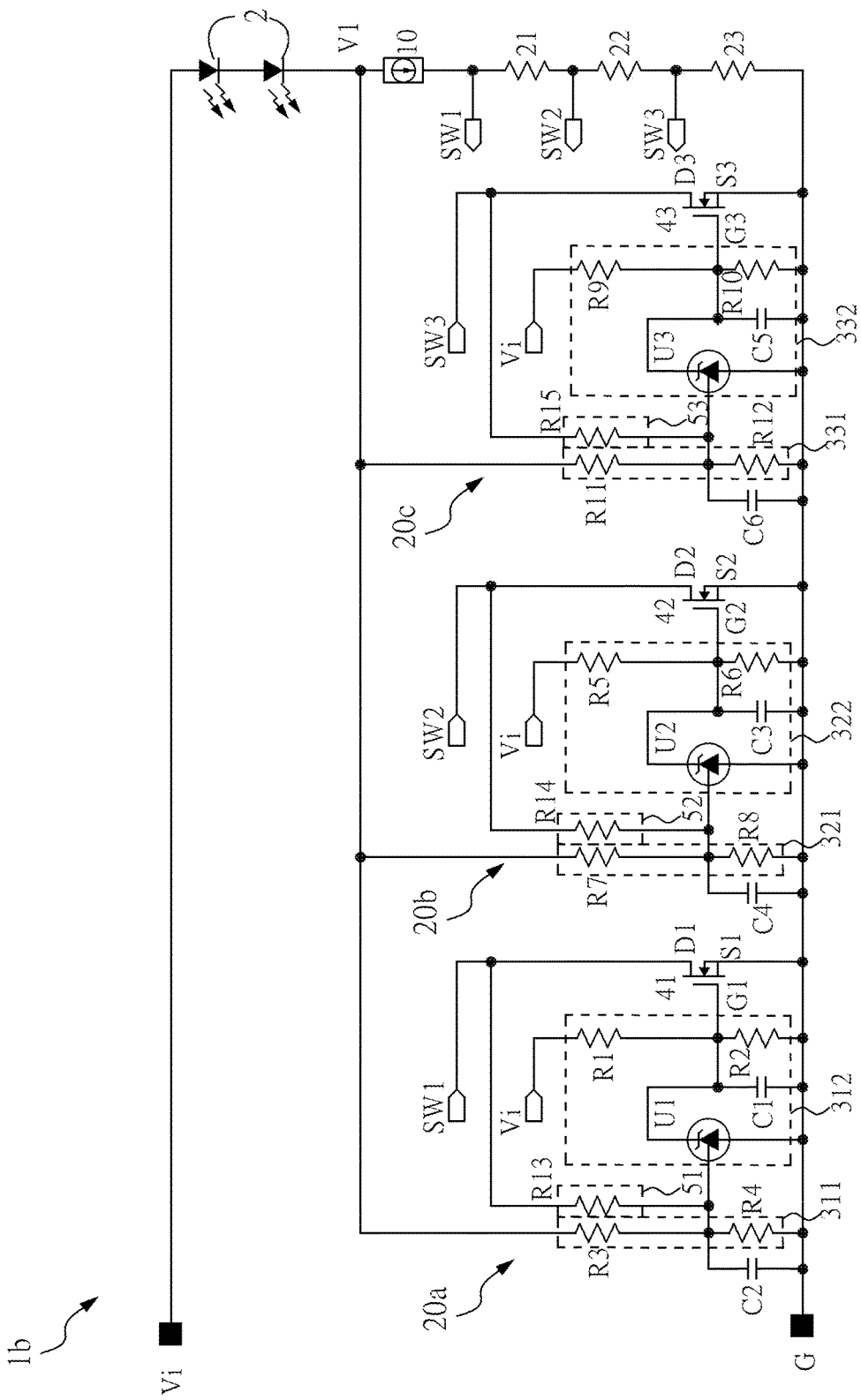
FIG. 6 is a schematic diagram showing a circuit of the constant current device according to the second embodiment of the present invention.

FIG. 6 is a schematic diagram showing a circuit of the constant current device in the second embodiment of the present invention.

In the second embodiment of the present invention, the circuit of the second heat dispersion module 20b and the third heat dispersion module 20c has the same configuration as the circuit of the first heat dispersion module 20a. Accordingly, the second detection circuit 321 of the second heat dispersion module 20b is a voltage divider circuit, including resistors R7, R8. The third detection circuit 331 of the third heat dispersion module 20c is also a voltage divider circuit, including resistors R11, R12. Each of the second control circuit 322 and the third control circuit 332 is a comparator, respectively including a three-terminal shunt regulator U2, resistors R5, R6, a three-terminal shunt regulator U3, and resistors R9, R10.

Each of the second switch unit 42 and the third switch unit 43 is also a transistor switch. The second switch unit 42 includes a second control terminal G2, a third connection terminal D2 and a fourth connection terminal S2. The second control terminal G2 is a gate terminal electrically connected to the second control circuit 322 and receives any of the second on signal and the second open signal. The third connection terminal D2 is a drain terminal electrically connected to the first impedance element 21, the second impedance element 22 and the second feedback unit 52, wherein the second feedback unit 52 is a resistor R14. The fourth connection terminal S2 is a source terminal electrically connected to the ground G. In the second embodiment of the present invention, the second threshold is Vref2*(R7+(R8//R14))/(R8//R14), where Vref2 is an internal reference voltage of the three-terminal shunt regulator U2, and the second threshold is greater than the first threshold. When the node voltage value V1 is greater than the first threshold but not greater than the second threshold, the second control terminal G2 receives the second on signal, and the third connection terminal D2 and the fourth connection terminal S2 are conducted to each other to form the on-state. At this time, the voltage divided by the resistors R7, R8 and the second feedback unit 52 (i.e., the second comparison voltage) is less than the internal reference voltage Vref2 of the three-terminal shunt regulator U2, and the three-terminal shunt regulator U2 is open-circuited, causing the third connection terminal D2 and the fourth connection terminal S2 of the second switch unit 42 to be short-circuited due to voltage division of the resistors R5 and R6. At this time, the second impedance element 22 is bypassed by the second switch unit 42.

When the node voltage value V1 is greater than the second threshold, the second control terminal G2 receives the second open signal, and the third connection terminal D2 and the fourth connection terminal S2 are non-conducted to each other to form the open state. At this time, the voltage divided by the resistors R7, R8 and the second feedback unit 52 is greater than the internal reference voltage Vref2 of the three-terminal shunt regulator U2, and the three-terminal shunt regulator U2 is short-circuited, causing the third connection terminal D2 and the fourth connection terminal S2 of the second switch unit 42 to be open-circuited due to insufficient cross-voltage between the second control terminal G2 and the fourth connection terminal S2. In other words, when the node voltage value V1 is greater than the first threshold but less than the second threshold, the first switch unit 41 is open-circuited, but the second switch unit 42 is short-circuited, and the current supplied from the power supply Vi flows through the light emitting unit 2, the current regulating unit 10, the first impedance element 21, and the second switch unit 42 to the ground G. When the node voltage value V1 is greater than the second threshold, the first switch unit 41 and the second switch unit 42 are both open-circuited, and the current supplied from the power supply Vi flows through the light emitting unit 2, the current regulating unit 10, the first impedance element 21, the second impedance element 22, and the third switch unit 43 or the third impedance element 23 to the ground G.

The third switch unit 43 includes a third control terminal G3, a fifth connection terminal D3 and a sixth connection terminal S3. The third control terminal G3 is a gate terminal electrically connected to the third control circuit 332 and receives any of the third on signal and the third open signal. The fifth connection terminal D3 is a drain terminal electrically connected to the second impedance element 22, the third impedance element 23 and the third feedback unit 53, wherein the third feedback unit 53 is a resistor R15. The sixth connection terminal S3 is a source terminal electrically connected to the ground G. In the second embodiment of the present invention, the third threshold is Vref3*(R11+(R12//R15))/(R12//R15), where Vref3 is an internal reference voltage of the three-terminal shunt regulator U3, and the third threshold is greater than the second threshold. When the node voltage value V1 is greater than the second threshold but not greater than the third threshold, the third control terminal G3 receives the third on signal, and the fifth connection terminal D3 and the sixth connection terminal S3 are conducted to each other to form the on-state. At this time, the voltage divided by the resistors R11, R12 and the third feedback unit 53 (i.e., the third comparison voltage) is less than the internal reference voltage Vref3 of the three-terminal shunt regulator U3, and the three-terminal shunt regulator U3 is open-circuited, causing the fifth connection terminal D3 and the sixth connection terminal S3 of the third switch unit 43 to be short-circuited due to voltage division of the resistors R9 and R10. At this time, the third impedance element 23 is bypassed by the third switch unit 43.

When the node voltage value V1 is greater than the third threshold, the third control terminal G3 receives the third open signal, and the fifth connection terminal D3 and the sixth connection terminal S3 are non-conducted to each other to form the open state. At this time, the voltage divided by the resistors R11, R12 and the third feedback unit 53 is greater than the internal reference voltage Vref3 of the three-terminal shunt regulator U3, and the three-terminal shunt regulator U3 is short-circuited, causing the fifth connection terminal D3 and the sixth connection terminal S3 of the third switch unit 43 to be open-circuited due to insufficient cross-voltage between the third control terminal G3 and the sixth connection terminal S3. In other words, when the node voltage value V1 is greater than the second threshold but less than the third threshold, the first switch unit 41 and the second switch unit 42 are open-circuited but the third switch unit 43 is short-circuited, and the current supplied from the power supply Vi flows through the light emitting unit 2, the current regulating unit 10, the first impedance element 21, the second impedance element 22, and the third switch unit 43 to the ground G. When the node voltage value V1 is greater than the third threshold, the first switch unit 41, the second switch unit 42 and the third switch unit 43 are open-circuited, and the current supplied from the power supply Vi flows through the light emitting unit 2, the current regulating unit 10, the first impedance element 21, the second impedance element 22, and the third impedance element 23 to the ground G. Accordingly, the first heat dispersion module 20a, the second heat dispersion module 20b and the third heat dispersion module 20c can utilize the first impedance element 21, the second impedance element 22 and the third impedance element 23 in an adaptive and multi-stage manner according to the node voltage value V1 to distribute and share the power dissipation of the current regulating unit 10 to further improve the heat dissipation of the current regulating unit 10.

In addition to the circuit components described above, the circuit of the present invention may include other circuit components such as resistors, capacitors C1 to C6, and inductors for the uses of voltage division, voltage regulation or bypassing, etc., respectively. Since other circuit component technologies are not the focus of the present invention, they will not be described in detail here.

As can be seen above, the constant current devices 1a, 1b of the present invention can utilize single heat dispersion module (e.g., the first heat dispersion module 20a) or plural heat dispersion modules (e.g., the first heat dispersion module 20a, the second heat dispersion module 20b and the third heat dispersion module 20c) to disperse the heat originally concentrated in the current regulating unit 10. Moreover, the present invention does not limit the number of heat dispersion modules. The number of the heat dispersion modules can be increased or decreased depending on demands.

Although the invention has been described with reference to the above embodiments, it will be apparent to those of ordinary skill in the art that modifications to the described embodiments may be made without departing from the spirit of the invention. Accordingly, the scope of the invention will be defined by the attached claims rather than by the above detailed descriptions.

What is claimed is:

1. A constant current device with adaptive distribution of power dissipation, used for stabilizing a current of a light emitting unit, the light emitting unit being electrically connected to a power supply, the constant current device comprising:
   a current regulating unit, which is electrically connected to the light emitting unit; and
   a first heat dispersion module, comprising:
   a first impedance element, which is electrically connected between the current regulating unit and a ground;
   a first detection control unit, which is electrically connected to the light emitting unit, for detecting a node voltage value between the light emitting unit and the current regulating unit;
   a first switch unit, which is electrically connected to the first detection control unit, the current regulating unit and the ground, the first switch unit being controlled by the first detection control unit to switch between an on-state and an open state according to the node voltage value; when the first switch unit is in the on-state, a current of the current regulating unit is conducted to the ground via the first switch unit; when the first switch unit is in the open state, the current of the current regulating unit is conducted to the ground via the first impedance element; and
   a first feedback unit, which is electrically connected between the first switch unit and the first detection control unit, causing the first switch unit to exhibit hysteresis when changing between the on-state and the open state.

2. The constant current device with adaptive distribution of power dissipation as claimed in claim 1, wherein if the node voltage value is not greater than a first threshold, the first switch unit is in the on-state; if the node voltage value is greater than the first threshold, the first switch unit is in the open state.

3. The constant current device with adaptive distribution of power dissipation as claimed in claim 2, further comprising:
   a second heat dispersion module, comprising:
   a second impedance element, which is electrically connected between the first impedance element and the ground;
   a second detection control unit, which is electrically connected to the light emitting unit; and
   a second switch unit, which is electrically connected to the second detection control unit, the first impedance element and the ground, wherein the second detection control unit detects the node voltage value, the second switch unit is controlled by the second detection control unit to switch between an on-state and an open state according to the node voltage value; when the second switch unit is in the on-state, a current of the first impedance element is conducted to the ground via the second switch unit; when the second switch unit is in the open state, the current of the first impedance element is conducted to the ground via the second impedance element.

4. The constant current device with adaptive distribution of power dissipation as claimed in claim 3, wherein the second heat dispersion module further comprises:
   a second feedback unit, which is electrically connected between the second switch unit and the second detection control unit, causing the second switch unit to exhibit hysteresis when changing between the on-state and the open state.

5. The constant current device with adaptive distribution of power dissipation as claimed in claim 4, wherein if the node voltage value is not greater than a second threshold, the second switch unit is in the on-state; if the node voltage value is greater than the second threshold, the second switch unit is in the open state, wherein the second threshold is greater than the first threshold.

6. The constant current device with adaptive distribution of power dissipation as claimed in claim 5, further comprising:
   a third heat dispersion module, comprising:
   a third impedance element, which is electrically connected between the second impedance element and the ground;
   a third detection control unit, which is electrically connected to the light emitting unit; and
   a third switch unit, which is electrically connected to the third detection control unit, the second impedance element and the ground, wherein the third detection control unit detects the node voltage value, and the third switch unit is controlled by the third detection control unit to switch between an on-state and an open state according to the node voltage value; when the third switch unit is in the on-state, a current of the second impedance element is conducted to the ground via the third switch unit; when the third switch unit is in the open state, the current of the second impedance element is conducted to the ground via the third impedance element, wherein if the node voltage value is not greater than a third threshold, the third switch unit is in the on-state; if the node voltage value is greater than the third threshold, the third switch unit is in the open state, wherein the third threshold is greater than the second threshold.

7. The constant current device with adaptive distribution of power dissipation as claimed in claim 6, wherein the third heat dispersion module further comprises:
   a third feedback unit, which is electrically connected between the third switch unit and the third detection control unit, causing the third switch unit to exhibit hysteresis when changing between the on-state and the open state.

8. The constant current device with adaptive distribution of power dissipation as claimed in claim 1, wherein the first detection control unit comprises:
   a first detection circuit, which is electrically connected to the light emitting unit; and
   a first control circuit, which is electrically connected to the first detection circuit, wherein the first detection circuit detects the node voltage value and generates a first comparison voltage according to the node voltage value, and the first control circuit outputs one of a first on signal and a first open signal according to the first comparison voltage.

9. The constant current device with adaptive distribution of power dissipation as claimed in claim 8, wherein the first detection circuit is a voltage divider circuit, the first switch unit is a transistor switch, the first feedback unit is a resistive component, and the first control circuit is a comparator.

10. The constant current device with adaptive distribution of power dissipation as claimed in claim 8, wherein the first switch unit comprises:

a first control terminal, which is electrically connected to the first control circuit and receives any of the first on signal and the first open signal;

a first connection terminal, which is electrically connected to the current regulating unit, the first impedance element and the first feedback unit; and a second connection terminal, which is electrically connected to the ground, wherein when the first control terminal receives the first on signal, the first connection terminal and the second connection terminal are conducted to each other to form the on-state; when the first control terminal receives the first open signal, the first connection terminal and the second connection terminal are non-conducted to each other to form the open state.

11. The constant current device with adaptive distribution of power dissipation as claimed in claim 10, wherein the first detection circuit is a voltage divider circuit, the first switch unit is a transistor switch, the first feedback unit is a resistive component, and the first control circuit is a comparator.

12. A heat dispersion module, used in a constant current device to electrically connect a current regulating unit, the current regulating unit being used for stabilizing a current of a light emitting unit, and the light emitting unit being electrically connected to a power supply; the heat dispersion module comprising:

an impedance element, which is electrically connected between the current regulating unit and a ground;

a detection control unit, which is electrically connected to the light emitting unit, for detecting a node voltage value between the light emitting unit and the current regulating unit;

a switch unit, which is electrically connected to the detection control unit, the current regulating unit and the ground and controlled by the detection control unit to switch between an on-state and an open state according to the node voltage value; when the switch unit is in the on-state, a current of the current regulating unit is conducted to the ground via the switch unit; when the switch unit is in the open state, the current of the current regulating unit is conducted to the ground via the impedance element; and a feedback unit, which is electrically connected between the switch unit and the detection control unit, causing the switch unit to exhibit hysteresis when changing between the on-state and the open state.

13. The heat dispersion module as claimed in claim 12, wherein if the node voltage value is not greater than a threshold, the switch unit is in the on-state; if the node voltage value is greater than the threshold, the switch unit is in the open state.

14. The heat dispersion module as claimed in claim 12, wherein the detection control unit comprises:

a detection circuit, which is electrically connected to the light emitting unit; and a control circuit, which is electrically connected to the detection circuit, wherein the detection circuit detects the node voltage value and generates a comparison voltage according to the node voltage value, and the control circuit outputs one of an on signal and an open signal according to the comparison voltage.

15. The heat dispersion module as claimed in claim 14, wherein the detection circuit is a voltage divider circuit, the switch unit is a transistor switch, the feedback unit is a resistive component, and the control circuit is a comparator.

16. The heat dispersion module as claimed in claim 14, wherein the switch unit comprises:

a control terminal, which is electrically connected to the control circuit and receives any of the on signal and the open signal;

a first connection terminal, electrically connected to the current regulating unit, the impedance element and the feedback unit; and a second connection terminal, electrically connected to the ground, wherein when the control terminal receives the on signal, the first connection terminal and the second connection terminal are conducted to each other to form the on-state; when the control terminal receives the open signal, the first connection terminal and the second connection terminal are non-conducted to each other to form the open state.

17. The heat dispersion module as claimed in claim 16, wherein the detection circuit is a voltage divider circuit, the switch unit is a transistor switch, the feedback unit is a resistive component, and the control circuit is a comparator.

* * * * *